W. F. BLEECKER AND W. L. MORRISON.
ALKALI EARTH METAL MATERIAL.
APPLICATION FILED OCT. 19, 1915.
1,311,380.
Patented July 29, 1919.
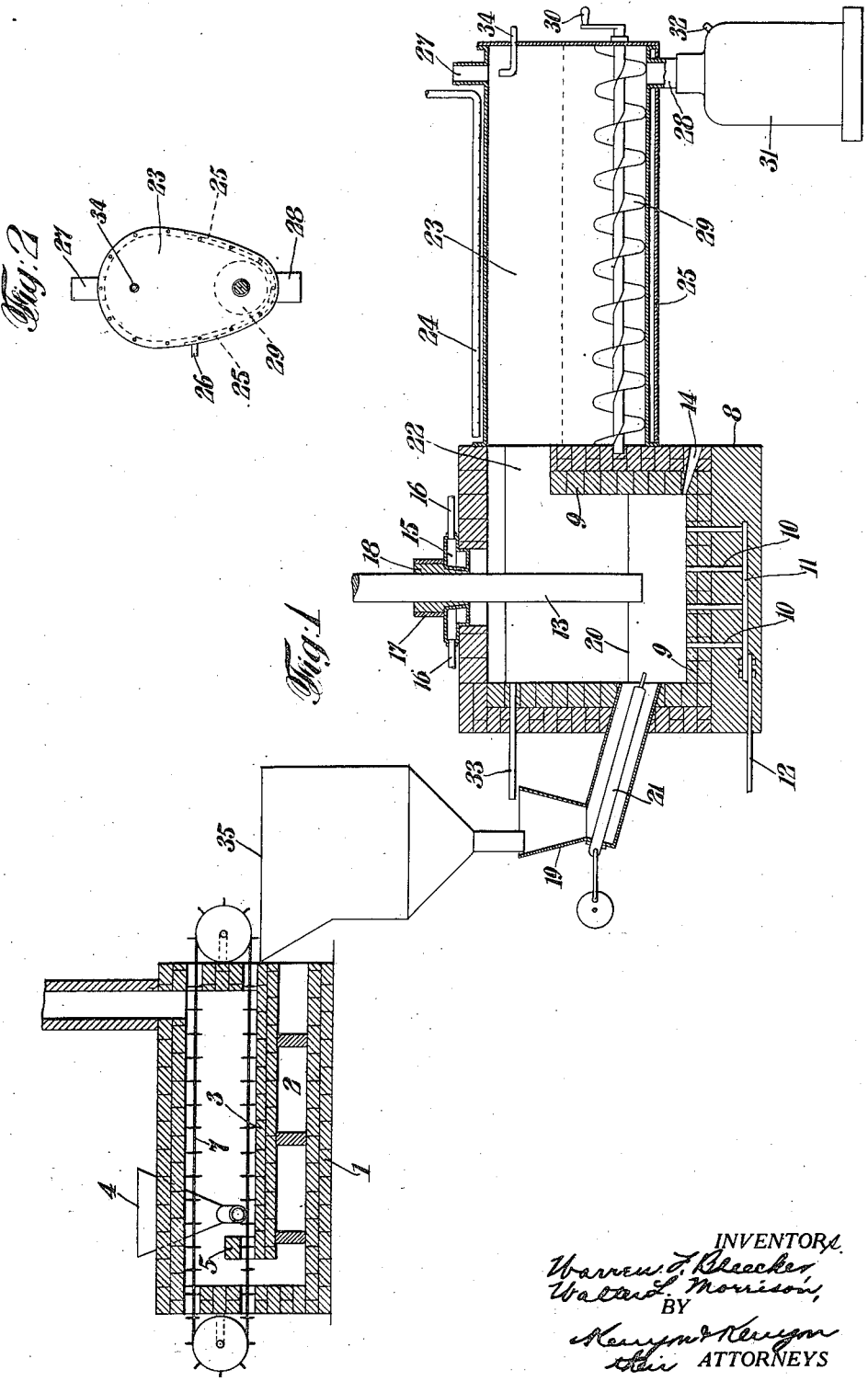

UNITED STATES PATENT OFFICE.

WARREN F. BLEECKER AND WALTER L. MORRISON, OF CANONSBURG, PENNSYLVANIA, ASSIGNORS TO ELECTRIC REDUCTION COMPANY, A CORPORATION OF DELAWARE.

ALKALI-EARTH-METAL MATERIAL.

1,311,380.

Specification of Letters Patent.   Patented July 29, 1919.

Application filed October 19, 1915.   Serial No. 56,736.

*To all whom it may concern:*

Be it known that we, WARREN F. BLEECKER and WALTER L. MORRISON, both citizens of the United States, residing at Canonsburg, county of Washington, State of Pennsylvania, have invented certain new and useful Improvements in Alkali-Earth-Metal Materials, of which the following is a specification.

Our invention relates to new and useful improvements in alkali earth metal materials. The invention contemplates the production of a new material, having such characteristics that it may be simply, cheaply and efficiently obtained, with great ease and rapidity. The new material is particularly useful for flashlight powders, certain chemical reduction reactions, pyrotechnics and in military illuminants. It is generally far more inflammable than ordinary magnesium powder or alkali earth metal powder. Owing to its fineness, it includes so much air that it flashes without any, or with much less oxidizing material, and it is far more searching and efficient in reduction reactions. More specific features will more clearly appear from the detailed description given below, in which the material is fully described, as well as one of the processes and apparatus for producing the same. The accompanying drawing, which forms a part of this specification, illustrates the apparatus. In the drawing, Figure 1 is largely diagrammatical of the apparatus, parts being shown in section to more clearly illustrate the same. Fig. 2 is an end view of the condenser.

While our invention comprises a new form of alkali earth metals, it is particularly advantageous as comprehending in a more specific embodiment thereof, a magnesium material. In the preferred embodiment of the invention, the material is in the form of a fine powder, substantially impalpable, and incapable of being fused together to form a liquid under ordinary pressures, and having the characteristics that it is amorphous, nodular, and has superficial impurities. Magnesium material in this form, has the characteristic that it is of dark color, as compared with the color of ordinary metallic magnesium, in crystalline form. Such material may be produced by condensing metallic magnesium vapors, under certain conditions. As will hereinafter more fully appear, our invention may be embodied in similar materials, in which other alkali earth metals form the basis.

In order to enable those skilled in the art to produce our improved materials, we will now describe in detail the processes and apparatus for producing the same.

We take magnesium containing material, preferably magnesium oxid containing material, such as magnesite or dolomite and if the materials have not already been suitably calcined, they are then placed in a reverberatory furnace and heated, so as to remove moisture therefrom and to break up any carbonates which may be present and so remove deleterious oxidizing components therefrom. With this calcined material in crushed form we mix a suitable reducing agent, preferably a metalloid reducing agent, such as crushed silicon or granulated metallic aluminum, or both. The reducing agent is mixed with the magnesium oxid containing material in substantially molecular proportions, according to the formulas

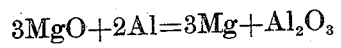
$$3MgO + 2Al = 3Mg + Al_2O_3$$

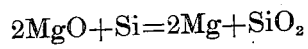
$$2MgO + Si = 2Mg + SiO_2$$

We then preferably add 25 per cent. excess (of the alkali earth metal oxid) of magnesium oxid or its equivalent calcium oxid, preferably partly both, to promote fluidity when the mixture is later reduced to molten slag. 5 to 10 per cent. (of the total alkali earth oxid) of fluorspar, $CaF_2$, or silicon, Si, may also be added to thin the slag and make a better flux, especially if aluminum is used as the reducing agent. If silicon is used it promotes the fluidity of the resultant slag and it may be used more or less without special flux or used with aluminum to improve the fluidity of the slag. The mixture, preferably hot, is then transferred or fed to an electric furnace, preferably alternating current, in which it is fused. The voltage of the electric furnace will, of course, vary with the nature of the slag, etc., but in some instances, we have found a voltage in the neighborhood of 40 or 50 volts suitable. The electric furnace is preferably of the conducting hearth type with the bottom or wall of the furnace forming one electrode, while the other electrode or electrodes are adapted to have their ends immersed in the molten mixture or bath. The bottom or wall of the furnace, which forms one electrode, is preferably constructed of magnesite brick (although carbon material may be used) with suitable metallic contacting members leading thereinto. The current passing from one electrode to another heats the mixture and fuses it. We have found in certain mixtures a temperature of 1300° to 1,500° C. is sufficient to produce a molten mixture. Due to the high heat, the magnesium oxid reacts with the aluminum or silicon or both, and metallic magnesium is volatilized, forming vapors thereof. These magnesium vapors are then conducted into a condenser and condensed to form metallic magnesium in solid or liquid form. If condensed very rapidly, that is, suddenly chilled, the magnesium vapors condense to form a fine powder, mostly impalpable and of dark color, having generally the characteristics that it is incapable of being fused together to form a liquid and that it is amorphous and nodular in form and has superficial impurities. These superficial impurities are believed to be a thin coating of an oxid or other impurities over the surface of the fine metallic particles, which act to make the material substantially incapable of being fused together to form a liquid. That is, if it is attempted to fuse such material, it is found that it does not form a liquid and if the temperature is increased, it finally vaporizes, without forming a liquid. Just what these superficial impurities are, in detail, is not certain. They are probably the cause of the dark color, which characterizes the material, as we have produced it. By condensing them quickly, in this way, if there is any carbon monoxid present in the gases, there is a tendency to prevent it reacting with the magnesium, causing the magnesium to be changed back with the oxid. If the volatilized magnesium is cooled slowly in a suitable atmosphere, it collects in an agglomerated form, rather than in the form of a fine powder.

The operation may be made substantially continuous, fresh portions of the mixture from the reverberatory or preheating furnace being fed either continuously or from time to time into the electric furnace, and the condensed magnesium or other alkali earth metal being removed either continuously or from time to time, from the condenser.

The slag formed in the electric furnace is tapped off from time to time. This slag preferably consists of the oxids of magnesium, calcium, silicon and aluminum, in varying proportions.

It is important that air be excluded from the electric furnace and condenser and in order to prevent the magnesium vapors from oxidizing, to produce oxid of magnesium, care is taken that the atmosphere in both the electric furnace and condenser is free from air or its constituents, and contains as little as possible of carbon monoxid or other gas readily decomposed or acted upon by magnesium or its vapors. The atmosphere should be substantially non-oxidizing. This may be done by either driving the electric furnace so rapidly that some magnesium vapor is expelled, or else by providing a working atmosphere of hydrogen or other inert gas. Preferably a combination of the two methods is employed, in the sense that the apparatus is supplied with sufficient inert gas, such as hydrogen, to avoid a material loss of magnesium vapor and at the same time, without permitting air to be sucked in at the condenser outlet.

The magnesium, particularly when condensed in the form of a fine powder, should be cooled before removing it from the neutral atmosphere to such an extent as to prevent any rapid surface oxidation thereof, which would cause the powder to heat up and superinduce active combustion thereof. We preferably cool it below 40° C., before removing it from the neutral atmosphere. It may, however, be removed from the condenser and put into any suitable receptacle, even before being so cooled, by keeping it in a neutral atmosphere during such transfer.

Referring to the drawing, 1 represents the preheating furnace, which is of the reverberatory type, the hot gases being introduced at 2, below the hearth 3. The alkali earth containing material is introduced through a hopper 4 on the hearth 3. The hot gases pass up around wall 5 and heat the materials, after which the gases pass out through a stack 6. A suitable conveyer 7 is provided for gradually moving the materials along the hearth 3 and out into the hopper 35, wherein they may be mixed with the reducing agent. The alternating current electric furnace is shown at 8, having its inner walls lined with magnesite brick 9, which contain one electrode of the furnace, this being shown as a series of iron pins or rods 10 which project up into the lining 9, these pins being connected with common iron conductor 11, which, in turn, is connected to a copper conductor 12. An opening 14 is provided at the bottom of the furnace, from which the slag may be tapped, as desired. The other electrode is shown at 13, and may be a rod of graphite or other suitable material. The electrode 13 is inserted through the top of the furnace and is surrounded by a water jacket 15, through which water is circulated by means of inlet and outlet pipes 16. Above the jacket 15 a ring 17 surrounds the electrode, which ring is packed with asbestos packing 18, in order that the furnace may be made substantially air-tight.

The hopper 35 discharges into a chute 19, which enters the electric furnace substantially below the surface of the bath, which surface is indicated in the drawing by the line 20. In order that the mixed materials may be conveniently injected into the bath, chute 19 is provided with a reciprocating plunger 21, operated from any suitable source of power, so as to push the material from the chute 19 into the molten bath, as desired. The end of electrode 13 is immersed in the bath 20, so that both electrodes of the furnace are in contact with the molten bath. In this way the heating action is due largely to the resistance of the bath to the current passing therethrough rather than to an arc between the bath and electrode 13, so that a more uniform and desirable heating action is produced.

The outlet of the electric furnace for the vapors and gases is shown at 22. This leads directly to a horizontal condenser 23, oval in cross section, as shown in Fig. 2, although, if desired, the top or wall of the furnace or other suitable surface may be used. In the form shown, there extends centrally along the top of condenser 23, a cold water pipe 24, which discharges cold water on top of the condenser in such manner that it runs down over both sides thereof. The lower half of the condenser is inclosed by a water jacket 25, and the water running down over the outer surface of the condenser is collected in this water jacket and may overflow therefrom through an outlet pipe 26. The condenser may be provided with an outlet for gases or vapors at 27, and an outlet for the condensed magnesium or other alkali earth metal at 28, or the gases may also be forced to exit through the outlet 28. In order that the condensed magnesium may be easily removed through the outlet 28, a worm or screw 29 is provided, which may be turned by handle 30, so as to force the material along the bottom of the condenser to and through the outlet 28. The material may be allowed to fall into cans or other receptacles, one of which is shown at 31. These receptacles may be provided with gas inlets 32, through which inert gas may be injected in order to fill the receptacle with gas, so that when the condensed magnesium is deposited in the receptacle, there is no danger of rapid surface oxidation thereof. By observing or testing the gases which flow from the exit 27, if any, it may be determined whether the condensing action is sufficient. In order to make sure that the atmosphere in the furnace and condenser is non-oxidizing, and to keep the furnace and atmosphere free from air or its constituents, inlet pipes 33 and 34 may be provided, through either or both of which hydrogen or other inert gas may be injected into the furnace and condenser in an amount sufficient to prevent any material amount of air being sucked in through the outlet 27, by reason of the suction produced by the condensing action.

What we claim is:

1. The improved magnesium material comprising a powder containing largely metallic magnesium in amorphous form.

2. The improved magnesium material comprising magnesium in the form of fine powder having the characteristic that it is nodular.

3. The improved magnesium material comprising magnesium in the form of a fine powder incapable of being fused together to form a liquid.

4. The improved magnesium material comprising magnesium in the form of a fine powder incapable of being fused together to form a liquid and having the characteristics that it is amorphous, nodular and has superficial impurities.

5. The improved alkali earth metal material comprising alkali earth metal in the form of a fine powder incapable of being fused together to form a liquid.

6. The improved alkali earth metal material comprising alkali earth metal in the form of a fine powder incapable of being fused together to form a liquid and having the characteristics that it is amorphous, nodular and has superficial impurities.

In testimony whereof we have signed our names to this specification.

WARREN F. BLEECKER.
W. L. MORRISON.